United States Patent
Zanati et al.

(10) Patent No.: US 10,955,528 B2
(45) Date of Patent: Mar. 23, 2021

(54) BUILT-IN SELF-TEST RADAR UNIT AND METHOD FOR PHASE SHIFT MEASUREMENT THEREIN

(71) Applicant: NXP B.V., Eindhoven (NL)

(72) Inventors: Abdellatif Zanati, Hamburg (DE);
Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 228 days.

(21) Appl. No.: 16/119,083

(22) Filed: Aug. 31, 2018

(65) Prior Publication Data
US 2019/0146059 A1 May 16, 2019

(30) Foreign Application Priority Data

Nov. 10, 2017 (EP) .................................... 17201071

(51) Int. Cl.
*G01S 7/40* (2006.01)
*G01S 13/931* (2020.01)
(Continued)

(52) U.S. Cl.
CPC .......... *G01S 7/4017* (2013.01); *G01S 7/4052* (2013.01); *G01S 13/02* (2013.01); *G01S 13/931* (2013.01);
(Continued)

(58) Field of Classification Search
CPC ............... G01S 13/02; G01S 13/931; G01S 2013/0245; G01S 7/4017; G01S 7/4052; H01Q 21/28; H01Q 3/267; H01Q 3/38
See application file for complete search history.

(56) References Cited

U.S. PATENT DOCUMENTS 5,081,460 A    1/1992   Liu
5,134,411 A *  7/1992   Adler ...................... G01S 7/354
                                                         342/130
(Continued)

OTHER PUBLICATIONS

Lee, K., "A Built-In Performance-Monitoring / Fault Isolation and Correction (PM/FIC) System for Active Phased-Array Antennas", IEEE Transactions on Antennas and Propagation, No. 11, Nov. 1993.
(Continued)

*Primary Examiner* — Timothy X Pham

(57) ABSTRACT

A built-in self-test, BIST, radar unit (100) is described. The BIST radar unit (100) comprises: a frequency generation circuit (110) configured to generate a mmW transmit signal; a transmitter circuit comprising: at least one phase shifter (130, 132) configured apply at least one phase shift to the mmW transmit signal; and at least one phase inverter (140, 142) coupled to the at least one phase shifter (130, 132) and configured to invert a phase of the phase shifted mmW transmit signal. A receiver configured to receive and process a received version of the mmW transmit signal. The at least one phase inverter (140, 142) is configured to rotate the phase shifted mmW transmit signal to apply a secondary modulation to the mmW transmit signal; and the receiver is configured to receive and process a received version of the mmW transmit signal to determine an operational state of the BIST radar unit (100) based on a determined phase shift performance of the secondary modulation of the received version of the mmW transmit signal.

20 Claims, 4 Drawing Sheets

(51) Int. Cl.
  *H01Q 3/38*   (2006.01)
  *G01S 13/02*  (2006.01)
  *H01Q 3/26*   (2006.01)
  *H01Q 21/28*  (2006.01)

(52) U.S. Cl.
  CPC .............. *H01Q 3/267* (2013.01); *H01Q 3/38* (2013.01); *G01S 2013/0245* (2013.01); *H01Q 21/28* (2013.01)

(56) References Cited

U.S. PATENT DOCUMENTS

| | | | | |
|---|---|---|---|---|
| 5,140,198 | A | * | 8/1992 | Atherly .................. H03D 7/166 |
| | | | | 327/113 |
| 6,127,966 | A | | 10/2000 | Erhage |
| 9,379,436 | B1 | * | 6/2016 | Yu ............................ H01Q 3/38 |
| 2005/0012659 | A1 | | 1/2005 | Coleman, Jr. et al. |
| 2013/0135140 | A1 | * | 5/2013 | Kishigami ............ G01S 13/288 |
| | | | | 342/189 |
| 2014/0266865 | A1 | * | 9/2014 | Doyle ..................... G01S 7/354 |
| | | | | 342/174 |
| 2017/0170560 | A1 | * | 6/2017 | Ookawa .................. G01S 13/93 |
| 2018/0011171 | A1 | * | 1/2018 | McAleenan ....... G01R 31/2822 |

OTHER PUBLICATIONS

Zhang, J., "Calibration Method for the Single RF Channel Digital Beamforming Antenna Array, 2011 Cross Strait Quad-Regional Radio Science and Wireless Technology Conference", IEEE 2011.

Zhang, J., "Comparison of Correction Techniques and Analysis of Errors for Digital Beamforming Antenna Array With Single RF Receiver", IEEE Transactions on Antennas and Propagation, vol. 60, No. 11, Nov. 2012.

* cited by examiner

BUILT-IN SELF-TEST RADAR UNIT AND METHOD FOR PHASE SHIFT MEASUREMENT THEREIN

CROSS-REFERENCE TO RELATED APPLICATIONS

This application claims the priority under 35 U.S.C. § 119 of European Patent application no. 17201071.2, filed on 10 Nov 2017, the contents of which are incorporated by reference herein.

FIELD OF THE INVENTION

The field of the invention relates to a radar unit having a built-in self-test, BIST, and method for phase shift measurement therein. The invention is applicable to, but not limited to, a mmW radar unit with a built-in self-testing (BIST) system, which may be performed on-chip to allow a measurement of a phase shifter performance of mmW multiple radio frequency (RF) devices or circuits.

BACKGROUND OF THE INVENTION

A majority of the current millimetre wave (mmW) radar units are constructed using mmW integrated circuits (ICs) that include multi-channel transceivers (TRX) that are operable across a number of frequency channels. The mmW ICs also include high frequency devices, such as, power amplifiers, mixers, low noise amplifiers (LNAs). In the automotive radar field, the supported frequencies are in the 27 GHz and 76-81 GHz frequency bands.

Modern automotive radar systems use multiple transmitters and receivers to enable angle detection of the detected objects. Having a multi-channel transceiver, with associated mmW phase shifters, enables multiple in-multiple out (MIMO) techniques to be used to enhance the angular resolution. This allows applications, such as cruise control (that relies on restricting the radar beam to the lane the car is currently cruising), or such as blind angle detection (that relies on restricting the radar beam to this blind angle). In addition to the multiple channels, coding of the transmitter signals is needed to be able to distinguish between the transmitted signals. A MIMO radar with m transmitters and n receivers has m×n channels. The higher the number of channels, the higher the angular resolution of an identified received signal can be achieved.

Automotive safety standards such as ISO 26262 mandate the use of mitigating measures in case of safety-relevant defects; these mitigating measures need to be completed within a defined time interval that is small enough to prevent a system failure that could be dangerous to a person inside or outside the vehicle. Detecting safety-relevant defects in the radio frequency (RF) front-end of a car radar system can be performed using plausibility checks done in the radar unit that evaluates the RF front-end's output signal and calculates the target map from this signal. If this target map shows, e.g., suddenly appearing or disappearing targets, this would then lead to the target map being classified as not plausible and the RF front-end as possibly defect so that the unit could initiate safety measures, e.g. system reset, repetition of the measurement cycle, or notifying the driver that the radar system needs to be considered unsafe.

While such plausibility checks are very common in safety-critical systems, they have two severe drawbacks. A first drawback is directly related to safety, as every plausibility check bears the risk of false-positive or false-negative decisions. A second drawback is that such plausibility checks need to be implemented, documented and verified for a large number of possible faults including transient faults. All of these procedures are time-consuming and error-prone. These two drawbacks make it desirable to avoid the need for plausibility checks and to implement as much built-in safety monitoring as reasonable in the safety-critical elements themselves. As transient faults are a major source of malfunctions, it is desirable to be able to test these.

In vehicle radar systems, functional safety is crucial, as a malfunction can either lead to a dangerous situation—e.g. automatic braking because the malfunctioning system reports targets which actually don't exist, or to a failure to react, e.g. if existing targets are not detected. For both cases, a moderate system performance degradation is often the worst-case scenario, as a complete system failure would be immediately detected, whereas a moderate performance degradation might only lead to misinterpreting a target's size, position, direction of movement, etc., which could cause one of the above-mentioned malfunctions. This is especially true for malfunction of phase shifters in multi-transmitter vehicle radar systems, as such malfunction might lead the radar beam to be directed to a different angle than intended.

The measurement of phase at mmW frequency is very challenging and requires expensive test equipment. The phase shifter accuracy is measured in the laboratory using expensive mm-wave test setups, performed on a few samples. The measurement of the phase in a standard automated testing equipment (ATE) environment is not possible as standard ATE analog cards have an upper frequency limit in the approx. 100 MHz-range. Also, the direct measurement of the phase would requires down-converting the 77 GHz signal, which is usually not available in an ATE.

On-line self-test for functional safety is supported in some test systems, enabling concurrent tests to be performed in an application (normal operational) mode and, thus, also enabling detection of some transient failures due to single event upsets. It is known that an inaccurate phase may lead to an inability to distinguish the different signals coming from different transmitters. In this case the effective number of channels is reduced, which consequently reduces the angular accuracy.

Thus, there exists a need for an improved mechanism to measure a phase shift of radar unit with a mmW on-chip, for example using an on-chip internal RF built-in self-testing (BIST) system.

SUMMARY OF THE INVENTION

The present invention provides a built-in self-test, BIST, radar unit and method for phase shift measurement therein, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Examples of the invention are described with reference to a mechanism for measuring a radar phase-shift performance using an on-chip RF-BIST. Examples of the invention are described with reference to detecting parametric failures of circuits and circuit components in a radar unit, e.g. transmitters' phase shifters, using an on-chip RF-BIST that employs a Discrete Fourier Transform analysis of the received mmW signals. Examples of the invention propose the introduction of a secondary modulation scheme into the generation and detection of a mmW transmit signal, whereby the demodulation of the introduced secondary modulation may be used to identify a failure in one or more phase shifters or the phase shifter control circuit, or identify an inaccurate phase applied by the phase shifter. In some examples, the secondary modulation scheme may be achieved by a repetitive (or periodic) phase inversion of the mmW transmit signal through one or more phase inversion circuits. In some examples, phase measurement and detection approach may be performed on-line, concurrently with a normal radar (application) mode of operation. Examples of the invention also support detection of single event upsets during a normal application mode of operation, through the introduction of a second modulation signal into the transmitted mmW signal and the subsequent identification of specific peaks in the received mmW signal as a result of the second modulation signal when processed by the Fourier Transform. Furthermore, this measurement is automated and can be used in the standard automated test equipment environment.

Figure 1:
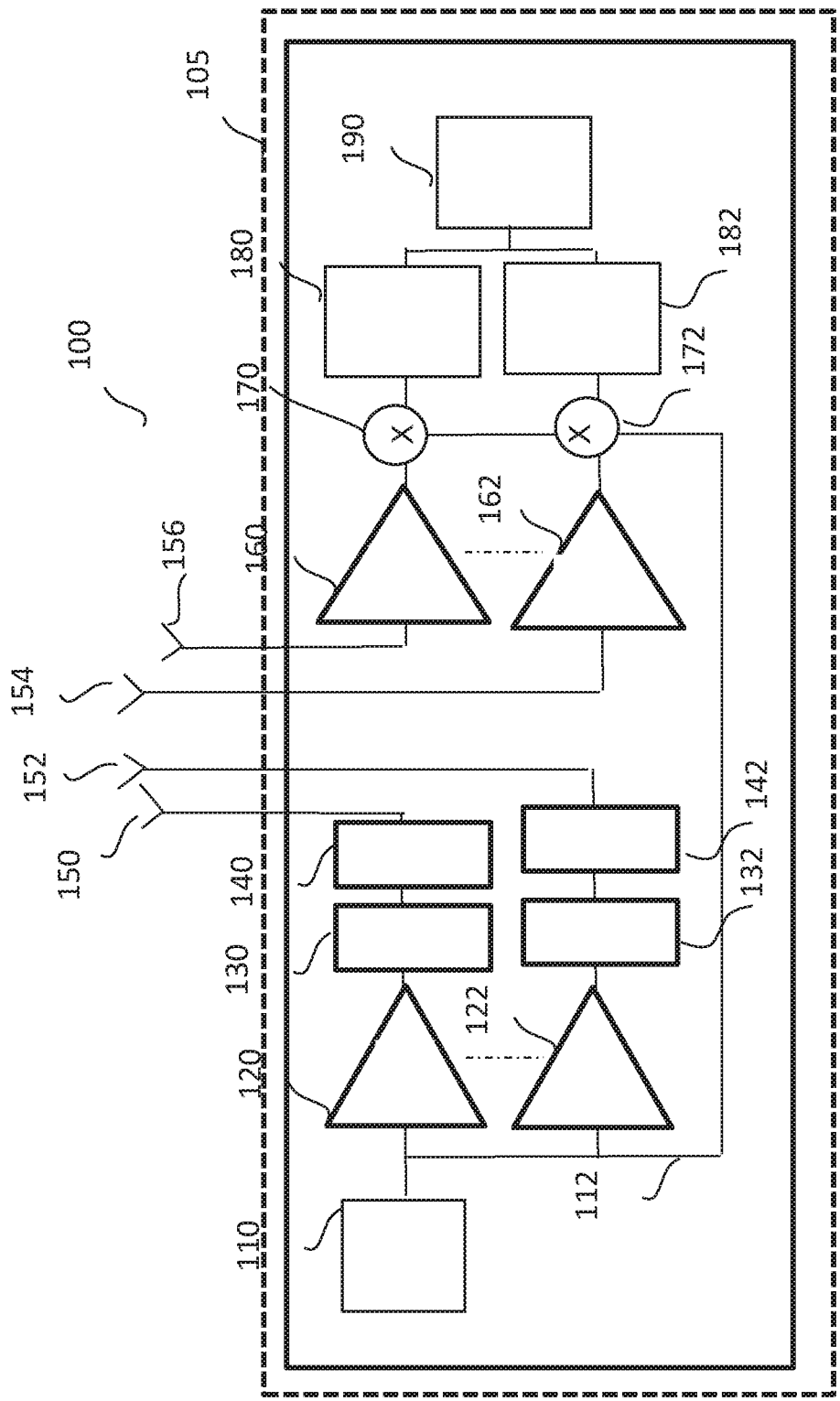
FIG. 1 illustrates an example of a multiple-in multiple-out (MIMO) radar unit, with a built-in self-testing (BIST) system, adapted according to example embodiments of the invention.
Figure 2:
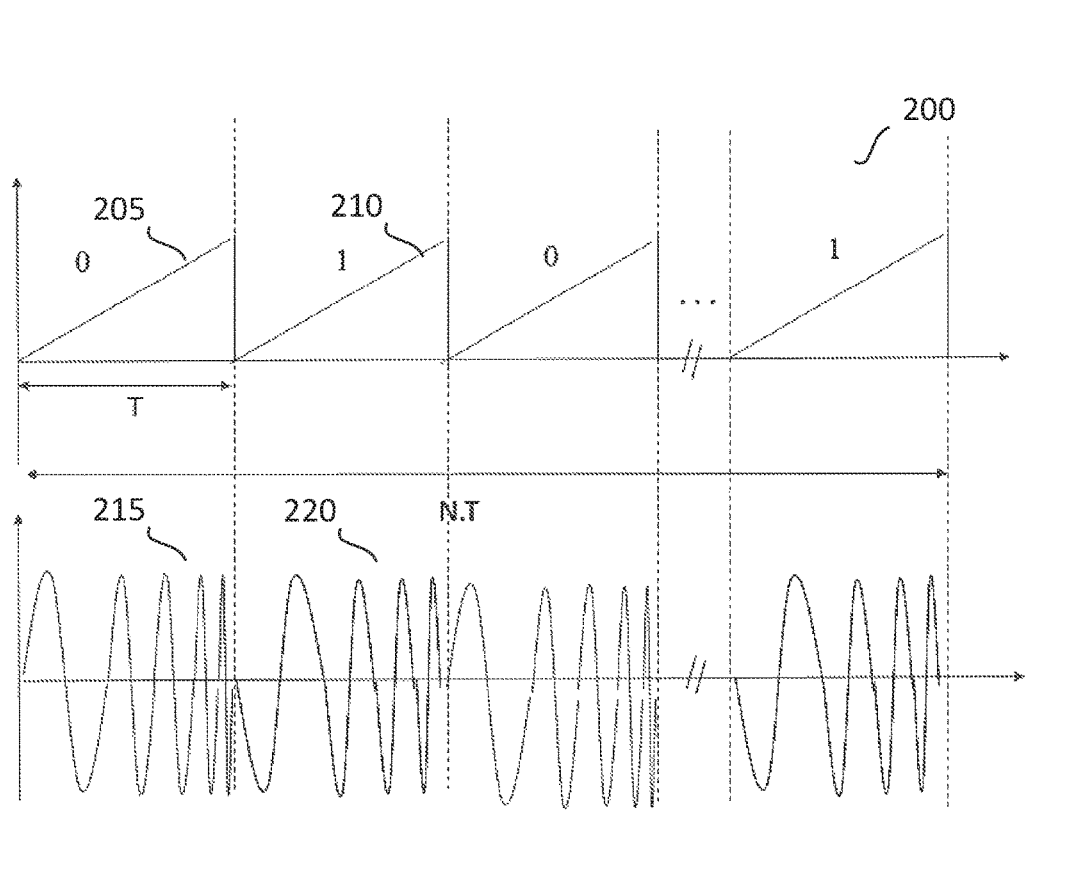
FIG. 2 illustrates an example 1-bit phase toggling from chirp to chirp, adapted according to example embodiments of the invention.

FIG. 1 illustrates an example of a multiple-in multiple-out (MIMO) radar unit 100, with built-in self-testing (BIST) system. The MIMO radar unit 100 includes at least two transmitters (each with a phase shifter and phase inverter) and two receivers, adapted according to example embodiments of the invention. The MIMO radar unit 100 can be realized using multiple ICs. Alternatively, a single IC 105 may be employed to implement the functionality of the radar unit. The MIMO radar unit 100 is configured to operate in a frequency modulated continuous wave (FMCW) mode of operation sometimes referred to as a chirp mode of operation. In other examples, embodiments of the invention may be applied in an ATE scenario, whereby the modulation supported by the MIMO radar unit 100 may be either FMCW or CW. The MIMO radar unit 100 includes one or more transmitter antenna(e) 150, 152 and one or more receiver antenna(e) 154, 156 and transceiver and signal processing circuits.

In a transmitter sense, a transmit radar signal is provided to a waveform generator (not shown), which may include a frequency chirp generator circuit. The waveform generator provides a signal that is to be modulated by a local oscillator (LO) circuit 110. The modulated signal is then optionally passed to a frequency multiplier (if the LO generated signal is not at the operating frequency of the radar unit). The high-frequency output 112 of the LO 110 (or the frequency multiplier) is passed to a plurality of transmit power amplifiers 120, 122, where it is amplified and routed to the one or more transmitter antenna(e) 150, 152. Two transmit paths and two receive paths are shown for simplicity purposes only, whereas in other examples more transceiver paths may be supported. In the illustrated radar unit 110, the amplified modulated signals from the plurality of transmit power amplifiers 120, 122 are passed through respective phase shifter circuits 130, 132 and respective phase inverter circuits 140, 142. The phase shifter circuits 130, 132 are used to modulate the transmitter signal differently in order to be able to separate and differentiate the differently modulated signals in the receiver. Using a delay line for the respective phase inverter circuits 140, 142, ensures an 'always-inverted' phase. In some examples, the phase shifter sequence may be programmable, for example TX1: 0°, 180°, 0°, 180°; TX2: 0°, 0°, 180°, 180°; TX3: 0°, 0°, 0°, 0°, etc. With an increased number of transmitters, higher modulation schemes are needed and, thus, a multi-bit phase shifter is preferred.

Coding of the transmitter signal can be achieved using a phase coding. Each transmitter signal can be individually coded using a phase shifter at the output of the last stage of the transmitter. Phase coding can be a 1-bit coding or n-bit coding to allow higher coding schemes, e.g. 1-bit coding allows for the two phases 0° and 180°, while e.g. 4-bit coding allows for 16 phases, with a phase difference of 25.5°.

In examples of the invention, the phase shifters 130, 132 may have a resolution of k bits. The number of bits determines the resolution of the phase shifter by $360°/2^k$, i.e. in a case of a 5-bit phase shifter a phase resolution of $360°/32=11.25°$. In most systems, a phase inverter, additional to the phase shifters, is used. This distinction is made because phase inverters can be realized by a simple signal inversion, while phase shifters are usually realized by signal delay mechanisms.

Examples of the invention are described with reference to a use of two phase inverters 140, 142. In other examples, a number of phase rotators may be used (where a value of k=1 (i.e. 1 bit is equivalent to 2 states) is implemented by the illustrated phase inverters 140, 142). In other examples of the invention, the phase shifters may be configured to function with higher values of 'k'.

In examples of the invention, the phase of the transmitted signal is either toggled from chirp to chirp with a frequency $\Delta f = 1/NT$, or toggled using an external signal in order to generate any desired frequency (e.g. 1 MHz). In this manner, toggling the phase with a low frequency (e.g. 1 MHz) creates a phase modulated signal, the frequency of which may be advantageously demodulated in the receiver using a Discrete Fourier Transform. In an application mode of operation, the phase toggling is part of the FMCW. In an ATE environment, it is envisaged that the phase toggling may be performed externally. In this context, a Chirp generator may be programmed to operate in a CW mode.

In examples of the invention, for on-chip testing, the crosstalk from transmitter circuitry to receiver circuitry is used as signal path, using leaked power across the transmitter-receiver parts of the radar unit. The attenuation of this path is typically in the 45-dB range for 77 GHz radar ICs. Hence, in contrast to other testing circuits, no dedicated 'on-chip' path is needed. This avoids the disadvantages of such a path (i.e. that such dedicated 'on-chip' paths use additional chip area and create additional cross-talk in a normal radar mode of operation).

As proposed in some examples, during each chirp, the transmitter signal is subjected to an additional (second) modulation. In some examples, the second modulation is based on a selected frequency of chirp, e.g. by periodically switching the phase inverter with a frequency within the passband of the IF stage to provide a stronger IF signal. Hence, in this manner, the transmitter signal contains frequency components that will be mixed down to frequency components that lie within the passband of the IF filter.

In a receiver sense, a radar signal is received at the plurality of receiver antenna(e) 154, 156 and passed to respective receiver low noise amplifiers (LNAs) 160, 162 where it is amplified. The amplified received radar signal is passed to respective quadrature down-mixers 170, 172, where the received, amplified signal is quadrature mixed with the high-frequency signal 112 output from the LO 110 to produce the amplitude and the phase information to be processed. In FMCW, the transmitting and receiving occurs at the same time. i.e. during the chirp. The same signal from the LO 110 is used to feed the transmitter circuits 120, 122 and the receiver circuits 160, 162. It is known that in order to reduce the high 1/f noise in such radar systems, the mixed down-converted (intermediate frequency (IF)) signal in the receiver is band-pass filtered. Thus, the down-converted received radar signal output from each down-mixer 170, 172 is input to a programmable baseband circuit that includes respective band-pass filters 180, 182 and one or more gain amplifiers, as well as an analog-to-digital converter (ADC) (not shown). Irrespective of the slope of the chirp ($\Box f/\Box t$), the band-pass cut-off frequency is usually chosen such that the echo signals of objects that are located very near to the radar antennae are filtered out.

In FMCW, the transmit signal changes its frequency proportional to the slope of the chirp ($\Delta f/\Delta t$) and to the distance radar unit to target. Hence, nearby targets exhibit a low frequency shift and thus low frequency in the IF, after the down-mixer, and require filtering out by a high-pass response. The digital output from the programmable baseband circuit that includes the band-pass filters 180, 182 is combined and input to a digital functional evaluation circuit 190, for example a signal processing unit for processing the received radar signal.

In examples of the invention, the digital functional evaluation circuit 190 is configured to capture the intermediate frequency (IF) spectrum and perform a Fourier Transform FFT on the captured IF spectrum to identify peaks of the IF spectrum that are associated with the introduced second modulation signal. In examples of the invention, the Fourier Transform may be any Discrete Fourier Transform, for example a Fast Fourier Transform (FFT).

In a testing process, which can be performed using an on-chip micro controller unit (MCU), an external MCU or using a laboratory PC, a determination is made as to whether a determined IF peak is at the frequency, (F1) of the phase toggling of the introduced second modulation. In an application mode of operation, the N chirps in the time domain are converted to a Doppler frequency by a Fourier Transform, such as a FFT, where the FFT has a length of N points and 1/(N*T) is the bin resolution of that FFT). A receiver processor can then analyse the amplitude and the phase of the IQ paths and, based on the demodulated phase information, it is possible to detect whether (or not) an error has occurred. In a test mode of operation, using a CW, the CW signal is toggled at a rate of, say, 1 MHz. As a consequence, the down-converted received signal shows a 1 MHz peak, which can be analysed in the same manner as above to detect whether (or not) there is an error.

If the identified IF peak following the Fourier Transform is at the F1 frequency, the phase of the peak is analysed. In one example, the analyses of the phase of the peak may include determining a phase and/or amplitude accuracy of k bits of a phase rotator of the received signal. In one example, the analysed phase steps may be compared to ideal phase values (noting that the radar unit knows the phase of the transmit signal) and any differences there between, e.g. errors, obtained and also analysed. If the Fourier Transform results do not identify an IF peak at the F1 frequency, the MCU (or laboratory PC) determines that there is a problem in the phase shifter or in the receiver path, as the second modulated signal that is introduced into the transmit path has not appeared at the receiver.

For fast chirp radars, the spectrum of the Doppler Fourier Transform (i.e. the Fourier Transform performed over the duration of the Chirp) is related to phase deviation where the bin size is:

$$\Delta f = 1/(2^k \cdot T) \qquad [1]$$

and the frequency resolution is defined as:

$$\Delta \phi = 360°/2^k \qquad [2]$$

Figure 3:
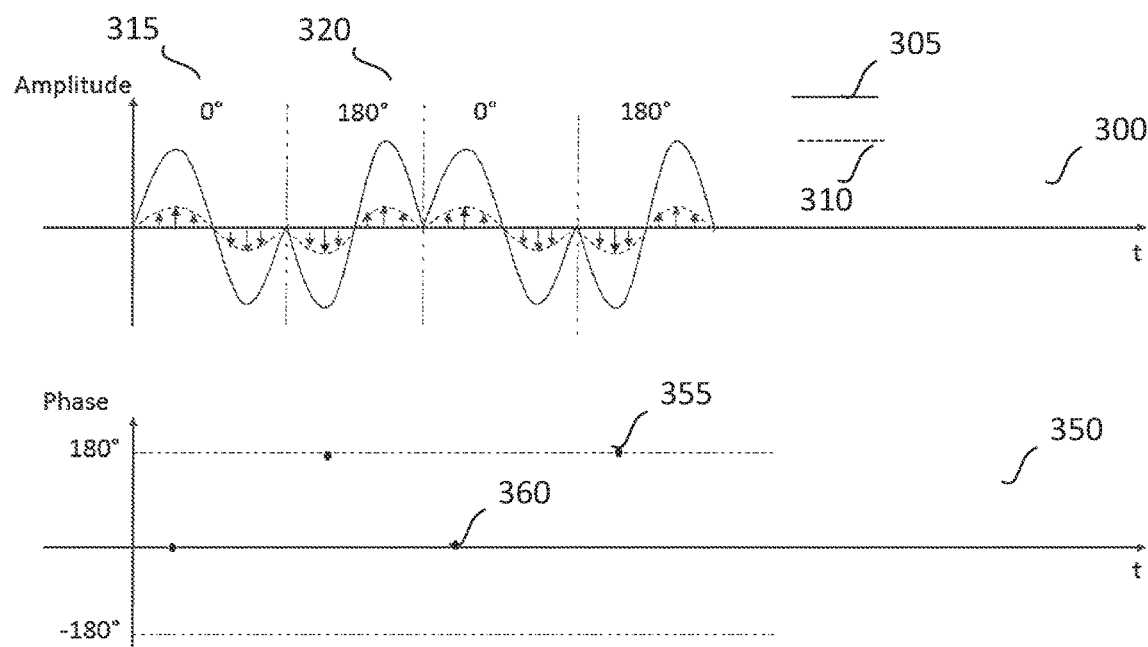
FIG. 3 illustrates an example 1-bit phase-modulated, down-converted IF signal, according to example embodiments of the invention.

From this calculation, the phase of the received signal may be derived. In some examples, the phase information may be derived from the down-converted (IF) signal, output from quadrature down-mixers 170, 172 as illustrated in FIG. 3. If the phase of the down-converted signal is analysed the phase moving from chirp to chirp steps according to the value $\Delta \phi$.

Referring now to FIG. 1, an example 1-bit phase toggling diagram 200 is illustrated, where the phase is toggled from chirp to chirp according to example embodiments of the invention. Here a first chirp signal 205 results in a first modulated signal 215. At a time period 'T', after the first chirp, the second chirp signal is inverted and a second chirp signal 210 results in a second modulated signal 220. This inversion process continues for the time length of the chirp sequence and equates to a bit phase togging between a '0' value and a '1' value at a frequency of the chirp period.

Figure 4:
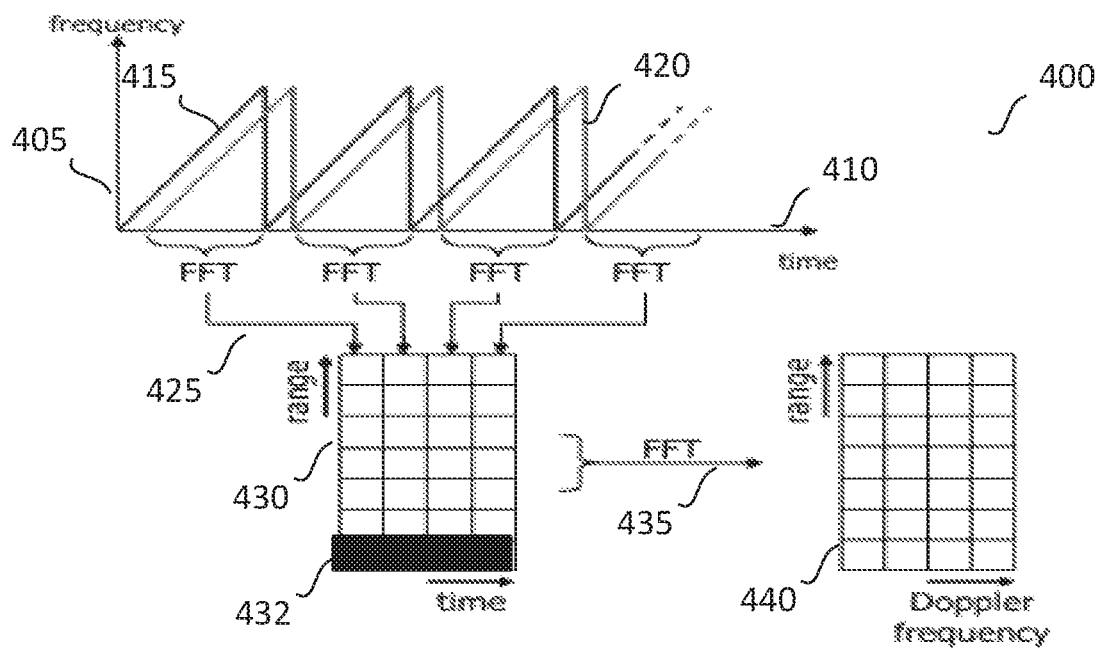
FIG. 4 illustrates an example 2D Fourier Transform, according to example embodiments of the invention.

FIG. 3 illustrates a corresponding example 1-bit phase modulated signal, according to example embodiments of the invention. A first diagram 300 illustrates amplitude versus time and respective phases 315, 320 of the transmitted signal 305 and a (45 dB reduced (crosstalk-captured)) down-converted IF signal 310. The phase information 315, 320 in the time domain may be converted to frequency via a FFT, as illustrated in FIG. 4. A second diagram 350 illustrates phase versus time and respective phase inversion results 355, 360 of the IF signal 310.

FIG. 4 illustrates an example of a 2D FFT being used in a chirp sequence 400 in the MIMO radar unit of FIG. 1, according to example embodiments of the invention. The chirp sequence 400 shows how the transmit signal 415 changes in frequency 405 versus time 410. The chirps of the received signal are routed 425 to respective fast fourier transform (FFT) circuits. In a first FFT, for each chirp the spectrum (e.g. amplitude versus function of frequency) is calculated and stored in a first FFT table 430. Four FFT and hence four columns of the table are shown for simplicity purposes only. The content of the first FFT table 430 is then applied through a second FFT 435, for each line of the frequency bins which have the same range, i.e. that have the same IF of the first FFT. Following this, a spectrum (amplitude and phase as function of Doppler frequency and range) is calculated and a second table 440 is populated.

In examples of the invention, only one line of the spectra bins 432 is converted to the frequency domain by the FFT 435, as the feedback path is so fast that there is no noticeable delay, i.e. no frequency shift.

Figure 5:
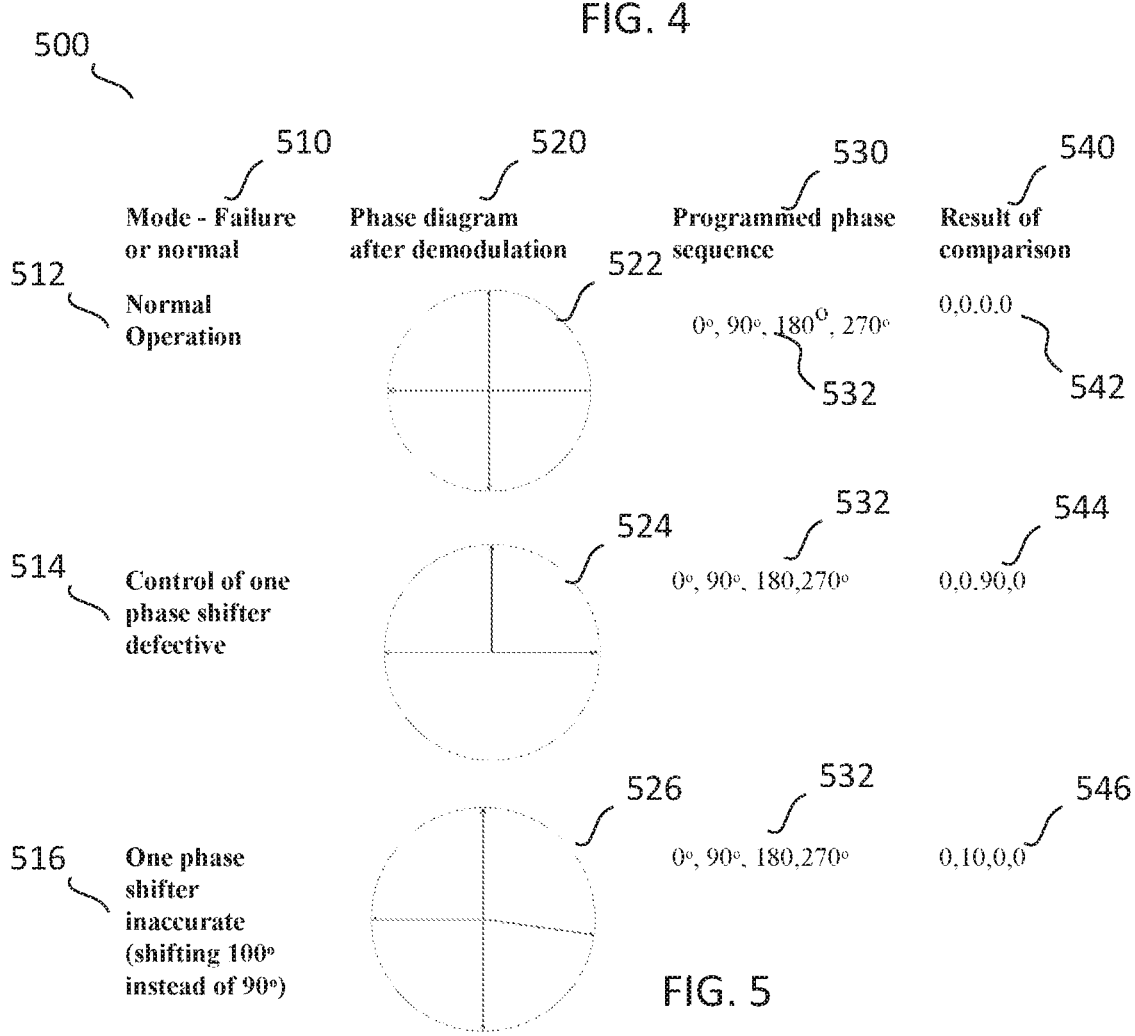
FIG. 5 illustrates an example of the phase shifts exhibited after a second modulation in order to identify an error following demodulation, according to example embodiments of the invention.

FIG. 5 illustrates an example table 500 of various phase shifts exhibited after a second modulation is introduced into a transmit signal in order to identify a potential error in the radar unit, according to example embodiments of the invention. A first column in the example table 500 illustrates a determined mode of operation 510 of the radar unit, such as MIMO radar unit 100 of FIG. 1, following the implementation of the secondary modulation scheme, according to examples of the invention. A second column in the example table 500 illustrates a determined phase diagram of the received signal after demodulation 520. A third column in the example table 500 illustrates an example of the programmed phase sequence 530, which is typically, in some examples, 0°, 90®, 180®, 270® sequence 532. A fourth column in the example table 500 illustrates a result of the comparison 540 between the programmed phase sequence 530 of a 0°, 90°, 180°, 270° sequence 532 and the detected phases of the received signal after demodulation and Fourier Transform.

A first row of the example table 500 identifies a normal operation 512 whereby the phase diagram of the received signal after demodulation 522 accurately reflects the programmed phase sequence 530 of a 0°, 90°, 180°, 270° sequence 532, and thereby results in a '0' error 542. A second row of the example table 500 identifies what happens when one of the controls of one of the phase shifters, e.g. a phase shifter 130, 132 of FIG. 1, is defective 514 whereby the phase diagram of the received signal after demodulation 524 does not reflect the programmed phase sequence 530 of a 0°, 90°, 180°, 270° sequence 532. In this scenario, there is an error of 0°, 0°, 90°, 0° in the result of the comparison 544. A third row of the example table 500 identifies what happens when one phase shifter e.g. a phase shifter 130, 132 of FIG. 1, provides an inaccurate phase shift 516 (e.g. shifting 1000 as compared to a desired 900). As such, the phase diagram of the received signal after demodulation 526 does not reflect the programmed phase sequence 530 of a 0°, 90°, 180°, 270° sequence 532. In this scenario, there is an error of 0°, 10°, 0°, 0°, in the result of the comparison 546. In this manner, it is possible to identify a specific problem in one or more transceiver paths and/or transceiver circuits or components by analysing the comparison results at 540

Figure 6:
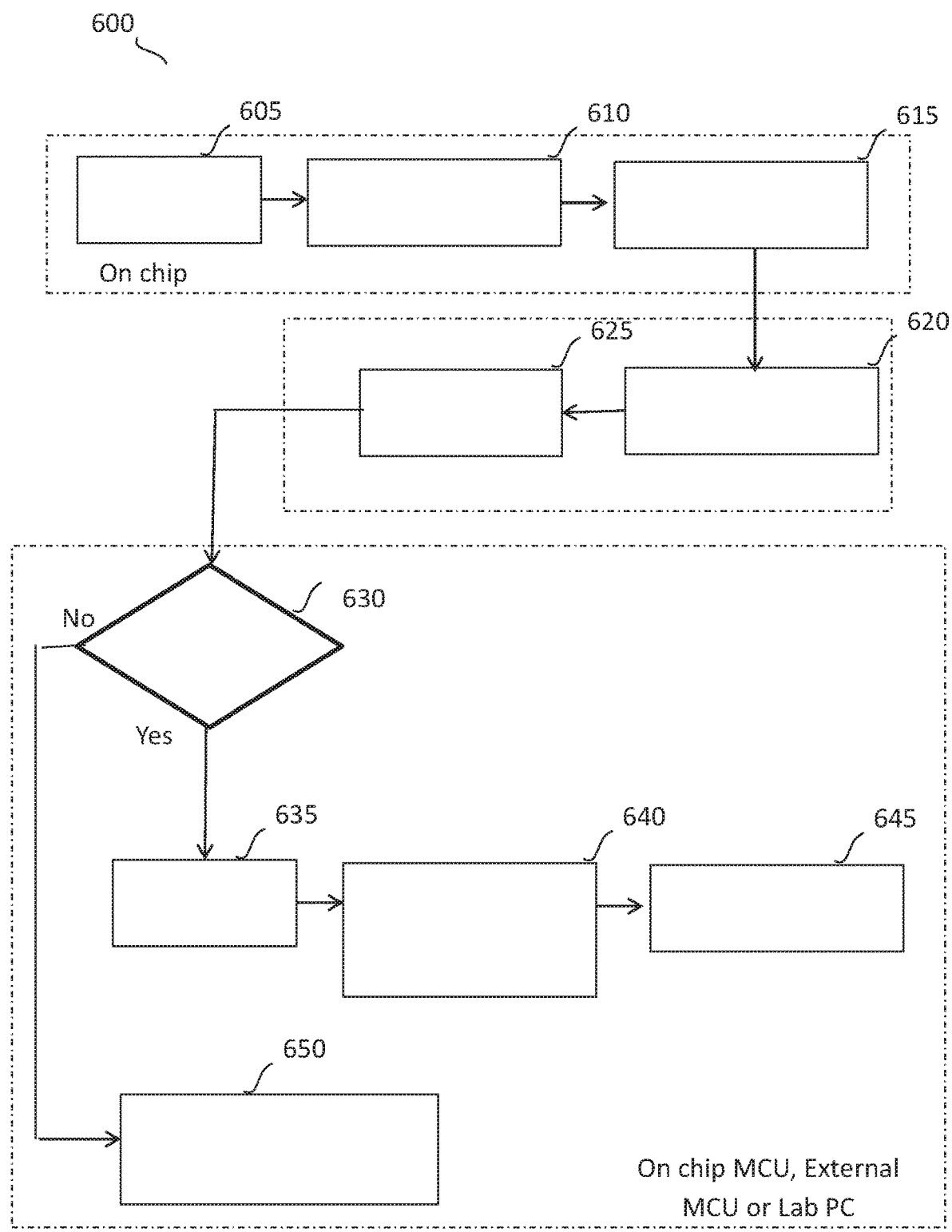
FIG. 6 illustrates an example flowchart for measuring a phase shift in a testing system for millimetre wave (mmW) integrated circuits or radar units, according to example embodiments of the invention.

Referring now to FIG. 6, an example flowchart 600 for performing a phase shift measurement in a testing system for a MIMO mmW radar unit, or integrated circuit (IC) therefor, is illustrated, according to example embodiments of the invention. At 605, in an on-chip FMCW (chirp) mode, the flowchart 600 commences with a set of 'N' chirps (or a continuous wave (CW) modulation scheme in an ATE environment) is employed. At 610, the phase is toggled at a particular rate, thereby creating a second modulation signal at a frequency F1. At 615, the intermediate frequency (IF) spectrum is captured. At 620, a Fourier Transform with N samples (NFFT) is created (where N is equal Nr chirps). At 625, the peaks of the IF spectrum are searched.

The testing process can then continue using an on-chip micro controller unit (MCU), an external MCU or using a laboratory PC. At 630, a determination is made as to whether the IF peak is at the F1 frequency (that is modulating the phase inverter circuits at a rate of, say, 1 MHz) has resulted in a demodulated signal at the same frequency, otherwise some component or circuit is identified as not functioning correctly. If the IF peak is at the F1 frequency at 630, the phase of the peak is analysed at 635. At 640, the analysed phase steps are compared to ideal values and any differences there between, e.g. errors, are analysed at 645. If the IF peak is not at the F1 frequency at 630, the MCU (or laboratory PC) determines that there is a problem in the phase shifter or in the receiver path at 650.

Thus, in this manner and in accordance with some examples of the invention, the BIST radar unit, such as radar unit 100, is able to self-determine an operational state of the radar unit and identify an error with one or more from a group of: phase shifter, a phase rotator, a control signal applied to a phase shifter, a down-mixer, an intermediate frequency stage, a signal generator.

Examples of the invention provide a built-in self-test, BIST, radar unit that includes: a frequency generation circuit configured to generate a mmW transmit signal; a transmitter circuit comprising: at least one phase shifter configured apply at least one phase shift to the mmW transmit signal; and at least one phase inverter coupled to the at least one phase shifter and configured to invert a phase of the phase shifted mmW transmit signal. A receiver configured to receive and process a received version of the mmW transmit signal. The at least one phase inverter is configured to rotate the phase shifted mmW transmit signal to apply a secondary modulation to the mmW transmit signal; and the receiver is configured to receive and process a received version of the mmW transmit signal to determine an operational state of the BIST radar unit based on a determined phase shift performance of the secondary modulation of the received version of the mmW transmit signal. In this manner, an improved mechanism to measure a phase shift of mmW on-chip, for example using on-chip internal RF built-in self-testing (BIST) system, is provided.

Examples of the invention are described with reference to operating in the Automotive Radar frequency band of 76 GHz to 81 GHz range. However, it is envisaged, that in other examples the circuits and concepts herein described may be equally applied to any mmW radar unit or system and any very-high operating frequency, for example where the testing system may require or benefit from accurate phase shift measurement of a packaged RF IC under test. In some examples, a standard ATE tester may be configured to make use of the results of the RF-BIST.

Thus, some examples of the invention support a phase shift measurement and phase-affecting circuit checks of a radar unit that can be performed on-line, using an introduced second modulation signal. Advantageously, the testing of the phase shifters can also be performed concurrently with the radar unit normal mode of operation. Examples of the invention benefit from a detection of a transmitted phase using the introduced second modulation of the transmitted signal by phase inverters. In some examples, the frequency of the second modulation may be of the order of approx. 1 MHz, although in other examples the frequency could be any suitable rate that allows a phase to be accurately detected using Fourier Transforms, without being affected by receiver filtering. Examples of the invention also benefit from avoiding a known need to provide a dedicated feedback path from the transmitter to receiver. Instead, examples of the invention use the existing crosstalk-path (due to the small distance between the transmitter circuits and receiver circuits on the IC, and their connections to the outside PCB, which may contain the antennae in some examples. Examples of the invention also enable a continuous monitoring of the phase shifters with the advantages of: long averaging time, thereby providing a possibility to reduce noise by averaging and thus to detect smaller deviations of the phase error than with a conventional test; as well as a possibility to detect slowly degrading phase shifter accuracy, due to slow ageing effects such as Negative Bias Temperature Instability (NBTI) performance degradation in CMOS ICs due to the dielectric between gate and channels degrading or Hot Carrier Injection (HCI), which also exhibits performance degradation due to charged particles entering the dielectric and changing its properties. Furthermore, since the two signals (i.e. the transmit mmW signal and the received version of the transmit mmW signal) are fully correlated (because the received signal is mixed down using the same LO signal 110 as used for transmission), the phase noise effect on the spectrum is minimal, which enhances the detectability of the peaks on the IF spectrum.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer RF or DC signals from or to the respective nodes, units or devices or components. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Also for example, in one embodiment, the illustrated examples may be implemented as circuitry located on a single integrated circuit such as single IC 105 of FIG. 1 or within a same device. Examples of the invention find applicability in many applications, including packaged ICs, and wafer test systems where the IC is not yet packaged), and/or in systems where a bare, unpackaged die is mounted on a printed circuit board (PCB). In some examples, the circuit and/or component examples may be implemented as any number of separate integrated circuits or separate devices interconnected with each other in a suitable manner. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A built-in self-test (BIST) radar unit comprises:
   a frequency generation circuit configured to generate a millimetre wave (mmW) transmit signal;
   a transmitter circuit comprising:
      at least one phase shifter configured to generate a phase shifted mmW transmit signal by applying at least one phase shift to the mmW transmit signal; and
      at least one phase rotator coupled to the at least one phase shifter and configured to rotate a phase of the phase shifted mmW transmit signal;
   a receiver configured to receive and process a received version of the phase shifted mmW transmit signal;
   wherein:
   the at least one phase rotator is configured to rotate the phase shifted mmW transmit signal to apply a secondary modulation to the mmW transmit signal; and
   the receiver is configured to receive and process a received version of the phase shifted mmW transmit signal to determine an operational state of the BIST radar unit based on a determined phase shift performance of the secondary modulation of the received version of the phase shifted mmW transmit signal.

2. The BIST radar unit of claim 1 wherein the phase shifted mmW transmit signal is routed to the receiver via signal leakage.

3. The BIST radar unit of claim 1 wherein the at least one phase rotator is configured to toggle a phase of a continuous wave, CW, frequency at the secondary modulation frequency.

4. The BIST radar unit of claim 1 wherein the at least one phase inverter is configured to toggle a phase of a chirp mmW transmit signal on successive chirps to generate a secondary modulation frequency.

5. The BIST radar unit of claim 1 wherein the receiver is configured to receive and process a received version of the phase shifted mmW transmit signal to determine an operational state of the BIST radar unit by applying at least one Fourier Transform on the received version of the phase shifted mmW transmit signal.

6. The BIST radar unit of claim 5 wherein the receiver determines that an error exists in a phase shifter or in a receive path in response to a failure to identify a peak in a captured spectrum that is the same as a frequency of the secondary modulation.

7. The BIST radar unit of claim 1 wherein the at least one phase rotator is at least one 'k-bit' phase rotator that rotates the phase of the phase shifted mmW transmit signal by an amount that is dependent upon the value 'k' and the receiver is configured to receive and process a received version of the mmW transmit signal to determine an operational state of the BIST radar unit by measuring a phase and accuracy of the k-bit phase rotator.

8. The BIST radar unit of claim 1 wherein the at least one phase rotator is at least one phase inverter.

9. The BIST radar unit of claim 1 wherein the determined operational state of the BIST radar unit includes identifying an error with one or more from a group of: phase shifter, a phase rotator, a control signal applied to a phase shifter, a down-mixer, an intermediate frequency stage, a signal generator.

10. The BIST radar unit of claim 1 wherein the receiver comprises a quadrature down-mixer configured to receive the version of the mmW transmit signal and operably coupled to a processor configured to process a quadrature down-mixed version of the mmW transmit signal to determine an operational state of the BIST radar unit based on a determined phase shift performance of the secondary modulation of the received version of the phase shifted mmW transmit signal.

11. An integrated circuit for a built-in self-test, BIST, radar unit, wherein the integrated circuit comprises:
    a frequency generation circuit configured to generate a mmW transmit signal;
    a transmitter circuit comprising:
        at least one phase shifter configured to apply at least one phase shift to the mmW transmit signal; and at least one phase rotator coupled to the at least one phase shifter and configured to rotate a phase of the phase shifted mmW transmit signal;
    a receiver configured to receive and process a received version of the mmW transmit signal;
    wherein:
    the at least one phase rotator is configured to rotate the phase shifted mmW transmit signal to apply a secondary modulation to the mmW transmit signal; and
    the receiver is configured to receive and process a received version of the mmW transmit signal to determine an operational state of the integrated circuit based on a determined phase shift performance of the secondary modulation of the received version of the mmW transmit signal.

12. A method for testing in a millimetre wave (mmW) built-in self-test (BIST) radar unit, the method comprising:
    generating a mmW transmit signal;
    applying at least one phase shift to the mmW transmit signal;
    inverting a phase of the phase shifted mmW transmit signal;
    receiving and processing a received version of the phase shifted mmW transmit signal;
    repetitively inverting the phase shifted mmW transmit signal in a predetermined manner to apply a secondary modulation to the phase shifted mmW transmit signal;
    determining a phase shift performance of the secondary modulation of the received version of the phase shifted mmW transmit signal; and
    determining an operational state of the BIST radar unit based on the determined phase shift performance of the secondary modulation.

13. The method of claim 12 further comprising routing the phase shifted mmW transmit signal to the receiver via signal leakage.

14. The method of claim 12 further comprising toggling a phase of a continuous wave, CW, frequency at the secondary modulation frequency by at least one phase rotator.

15. The method of claim 12 further comprising processing a received version of the phase shifted mmW transmit signal to determine an operational state of the BIST radar unit by applying at least one Fourier Transform on the received version of the phase shifted mmW transmit signal.

16. The method of claim 12, further comprising toggling a phase of a chirp mmW transmit signal on successive chirps to generate a secondary modulation frequency.

17. The method of claim 12, further comprising determining that an error exists in a phase shifter or in a receive path in response to a failure to identify a peak in a captured spectrum that is the same as a frequency of the secondary modulation.

18. The method of claim 12, further comprising receiving and processing a received version of the phase shifted mmW transmit signal to determine an operational state of the BIST radar unit by measuring a phase and accuracy of a k-bit phase rotator that rotates the phase of the phase shifted mmW transmit signal by an amount that is dependent upon the value 'k'.

19. The method of claim 12, further comprising identifying an error with one or more from a group of: phase shifter, a phase rotator, a control signal applied to a phase shifter, a down-mixer, an intermediate frequency stage, a signal generator.

20. The method of claim 12, further comprising processing a quadrature down-mixed version of the phase shifted mmW transmit signal to determine an operational state of the BIST radar unit based on a determined phase shift performance of the secondary modulation of the received version of the phase shifted mmW transmit signal.

* * * * *